UNITED STATES PATENT OFFICE.

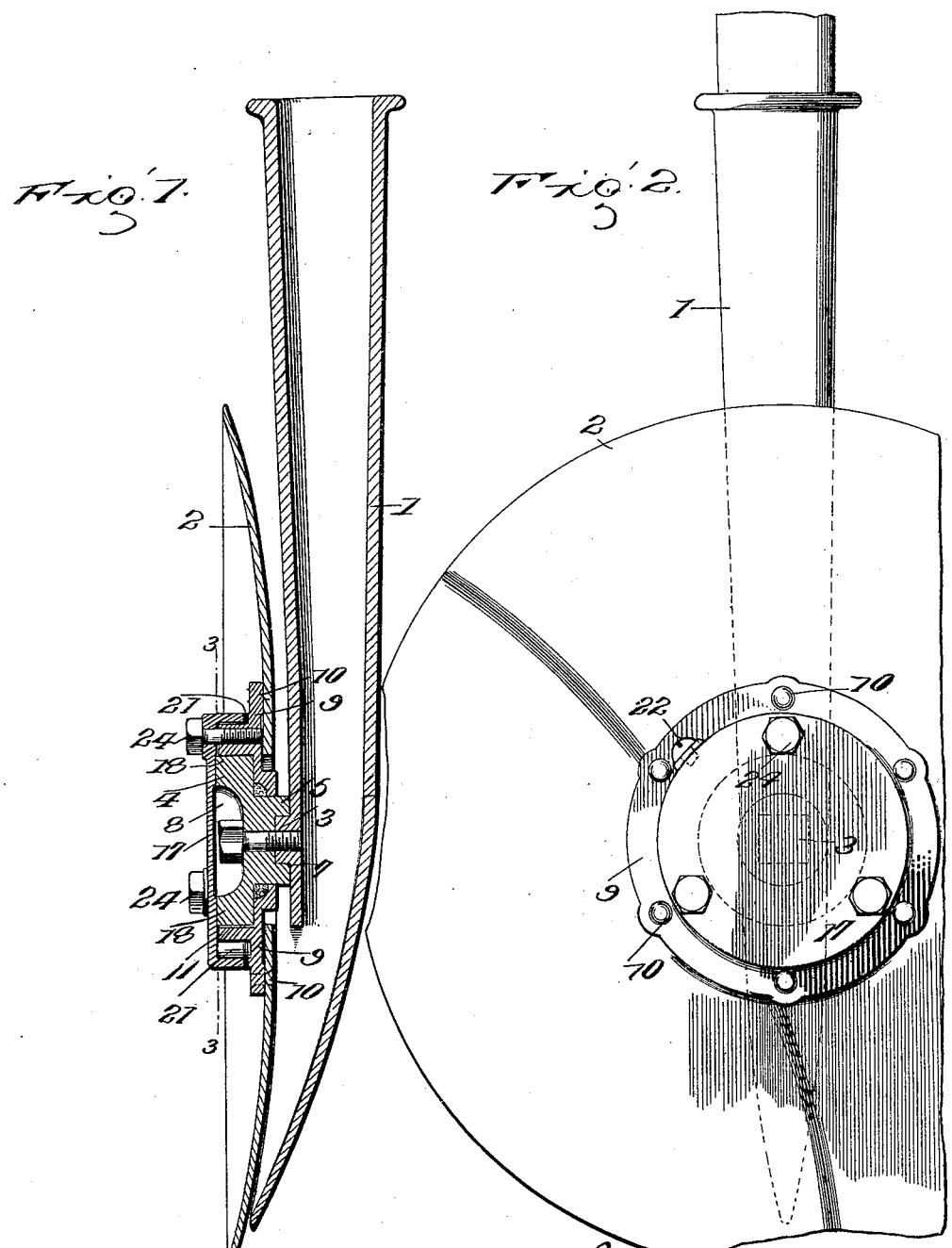

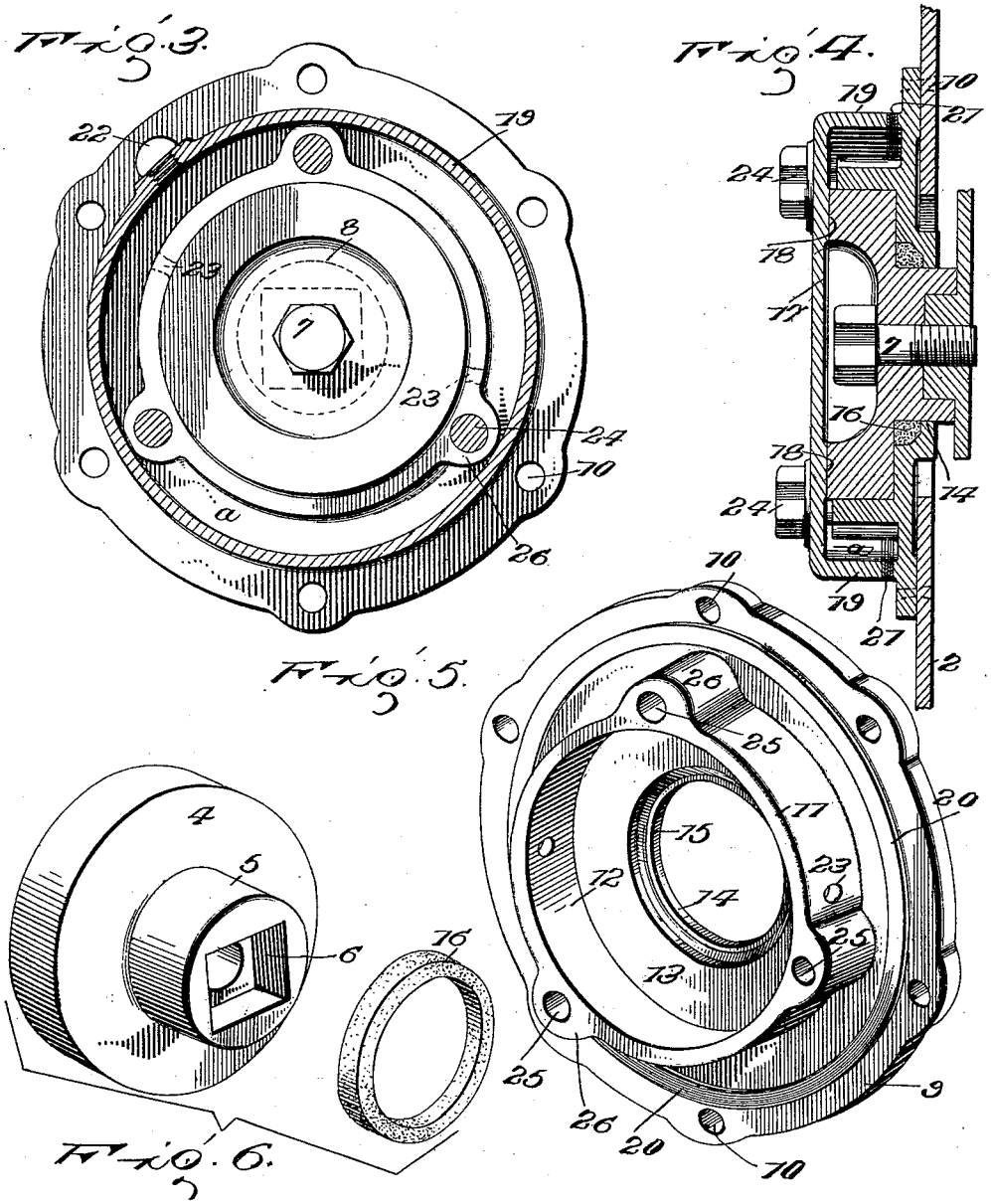

WILLIAM ELLIOTT, OF BEATRICE, NEBRASKA, ASSIGNOR TO DEMPSTER MILL MANUFACTURING COMPANY, OF BEATRICE, NEBRASKA, A CORPORATION OF NEBRASKA.

BEARING.

1,104,041.  Specification of Letters Patent.  Patented July 21, 1914.

Application filed November 18, 1912. Serial No. 732,088.

*To all whom it may concern:*

Be it known that I, WILLIAM ELLIOTT, a citizen of the United States, residing at Beatrice, in the county of Gage and State of Nebraska, have invented certain new and useful Improvements in Bearings, of which the following is a specification.

This invention relates to certain improvements in bearings for grain drill and other rotary disks; and the objects and nature of the invention will be readily understood by those skilled in the art in the light of the following explanation of the accompanying drawings illustrating what I now believe to be the preferred embodiment from among other formations, arrangements and constructions within the spirit and scope of my invention.

An object of the invention is to provide means and structures whereby the entrance of grit into the bearing will be reduced to the minimum; whereby a large supply of lubricant can be maintained in the bearing and in constant communication with the engaging surfaces; whereby wear can be easily taken up; and whereby the interior of the bearing will be readily accessible.

A further object of the invention is to provide certain improvements in details of construction and in arrangements and formations, whereby a simple, durable and highly efficient bearing will be provided for rotary disks, cutters and the like, employed in or in connection with agricultural implements.

The invention consists in certain novel features in construction and in combinations and arrangements as more fully and particularly set forth and specified hereinafter.

Referring to the accompanying drawings: Figure 1, is a vertical sectional view through the boot and disk of a grain drill equipped with my invention. Fig. 2, is a side elevation thereof. Fig. 3, is a vertical section on the line 3—3, Fig. 1, the disk not being shown. Fig. 4, is a cross section. Fig. 5, is a detail perspective view of the body portion of the journal box fixed to the disk. Fig. 6, is a detail perspective of the bearing block and the grit excluding felt or other washer.

In the particular example illustrated, I show one mechanical expression of my invention applied to a single disk grain drill but I wish it to be understood that my invention can be applied to double disk grain drills and to various rolling cutters and disks employed in agricultural implements or machinery.

In the embodiment illustrated, I show a boot 1, carrying a furrow opening rotary disk 2. The boot at one side is formed with a squared or angular boss 3, through which a tapped bolt hole centrally or longitudinally extends. The bearing block 4, for the disk is formed with an elongated reduced central cylindrical end neck 5, having a squared or angular socket 6, in its outer end to receive the boss 3, whereby the block is held against rotation. The bearing block is held to the boot or other suitable support and is clamped in position, by headed bolt 7, extending through a central bore in the block and screwing into the tapped hole in the boot. The outer end of the block is formed with a central oil cavity 8, receiving the head of the bolt 7. The bearing block is formed with flat parallel bearing surfaces at its inner and outer or opposite side faces, and with a cylindrical circumferential bearing surface, while the cylindrical surface of the neck 5, forms a bearing surface forming a right angle at its junction with the flat inner side face surface of the block. The disk 2, *per se*, is formed with a central opening, and is provided with a hub or journal box secured to and carrying the disk and mounted and rotating on the fixed bearing block. This hub or block is formed in or composed of two members or sections, one removable and the other fixed to the disk. The member fixed to the disk is formed by a strong plate or casting 9, of greater diameter than the opening in the disk. This plate fits the outer side face of the disk and is suitably riveted or otherwise fixed to the disk, usually at points 10. At its outer side, this plate is formed with an encircling flange 11, having a true cylindrical inner bearing surface 12, concentric with the axis of rotation of the disk and also concentric with and surrounding the circumferential bearing surface of the bearing block. The plate is also formed with a side bearing surface 13, parallel with and adapted to engage the inner side bearing surface of the block. The plate 9, has a central opening concentric with the axis of rotation to receive the neck 5, of the bearing block, and is annularly offset around said central opening and toward the boot to provide circular bearing edge 14, snugly fitting and rotatory about the surface of the neck 5, and an annular recess or socket 15, between said edge 14, and the adjacent vertical side face of the bearing block. This socket or recess 15, is tapered or reduced from the outer side face of the plate toward the edge 14, for the purpose of contracting a packing ring 16, snugly around the neck 5, to fill the space between the edge 14, and the inner side face of the block. This packing ring 16, is preferably composed of a comparatively large soft felt washer to snugly fit and rotate on said neck and fill the space about the neck and between the edge 14, and the side face of the block and effectively exclude grit from the interior of the journal box.

The surrounding beveled or tapered wall of the socket or recess 15, crowds and contracts the felt washer onto and snugly around the neck 5, as the washer is longitudinally compressed between the edge or annular lip 14, and the side face of the block 4. The width of the circumferential cylindrical bearing surface of the block 4, is slightly in excess of the width of the corresponding cylindrical bearing surface 12, of the journal box or disk hub, so that when the hub or box is on the bearing block with the inner side surface of the block abutting against the corresponding surface 13, of the box, the outer side or end of the block will project outwardly beyond the open outer end of the casing or box formed by annular flange 11.

The removable section or member 17, of the journal box or disk hub, provides an annular abutment or bearing surface 18, for the said outer end of the bearing block projected outwardly beyond the flange 11, of the fixed member of said box or hub. This removable member 17, is in the form of a cylindrical cap composed of a flat disk having a comparatively deep annular flange 19. The internal diameter of the flange 19, is greater than the external diameter of the open-side box formed by flange 11. The removable member is applied to the member fixed to the hub, to form the outer wall of the oil cavity 8, and to bring the bearing surface 18, into engagement with the outer end of the bearing block, and so that the flange 19, circumferentially surrounds the flange 11, and forms an oil chamber a, within flange 19, and around flange 11, and between the plate 9, and the outer end or disk 17, of the cap or removable member.

An oil tight joint is formed between the end edge of flange 19, and the preferably ground annular surface 20 of the plate 9. This oil tight joint can be packed by a series of parallel superimposed separately removable thin flat rings or liners 21, arranged and compressed between the edge of flange 19, and said surface 20. These thin rings can be composed of paper, pulp material or any other suitable substance.

An oil hole can be provided through flange 19, and this hole is normally tightly closed by removable screw plug 22. Oil passages or ducts 23, are also provided extending radially through the flange 11, for the passage of oil from oil supply chamber a, to the annular bearing surfaces of the box traveling in engagement with the bearing block. The removable section or cap 17, 19, is so formed with respect to the flange 11, as not to abut against the outer end edge of flange 11, but so as to leave an intervening narrow space for the passage of oil from oil supply chamber a, over the outer edge of flange 11, and to the bearing surface 18, and also to the oil cavity 8, although said cavity 8, preferably constitutes an additional original oil supply chamber.

The cap or removable section 17, 19, is removably and adjustably secured by several bolts 24, having their heads exposed and accessible at the outer side of the removable cap and from thence extending through holes in said cap into tapped holes or sockets 25, extending through the fixed member of the journal box. The flange 11, is provided with exterior enlargements 26, to provide sufficient thickness of metal or body to receive said tapped holes. The screws 24, are longitudinally adjustable in said sockets 25, to clamp the cap against the rings 21, under the necessary pressure to maintain the desired oil tight joint, and also to maintain the desired comparatively close fit between the opposite ends or walls of the journal box and the side faces of the bearing block, and also to maintain the desired snug grit-excluding fit of the felt washer 16, around the cylindrical neck 5, of the bearing block. By removing these bolts 24, the cap or removable section of the journal box is released and can be removed to expose the interior of the box, the oil chambers, the bearing block and the bolt 7. The cap can be readily removed and as readily applied and secured in place.

By means of the bolts 24, the cap can be readily adjusted to maintain the desired degree of tightness against the bearing block.

By employing the series of thin separately removable rings or washers 21, looseness due to wear of the bearing block and box can be quickly and easily taken up. Should the end surfaces of the bearing block and box wear to such an extent that looseness cannot be taken up by tightening the bolts 24, it is only necessary to remove one or more of the thin rings 21, until the desired tightness of the bearing can be secured by tightening bolts 24.

Material advantages are attained by providing the bearing with such extensive oil containing capacity, and with the oil chamber exteriorly of the bearing surfaces and in oil feeding communication therewith.

By providing a journal box with the relatively large removable section, the outer side of the box can be completely opened quickly and easily by removing the cap securing bolts and the cap. The bearing block can then be easily removed from the journal box through said open outer side, after the bolt securing the block to the boot or other support has been unscrewed from the boot. This relatively large removable outer wall section of the box, also enables me to quickly apply the block to the disk journal box and secure the block to the bolt. The disk can be thus removed from the bearing block or the bearing block from the disk, for any purpose without the necessity of cutting rivets or without requiring other slow or difficult operations.

It is evident that variations, modifications and changes might be resorted to in the mechanical expression of my invention illustrated without departing from the spirit and scope of the invention and hence I do not wish to limit myself to the exact disclosure hereof.

What I claim is:—

1. In combination, a bearing block having circumferential and end bearing surfaces, means for supporting said block against rotation, and a rotary element provided with a central journal box inclosing and rotating on said block, said box consisting of a cup-like member fixed to the rotary element and providing an end wall having a bearing surface at the inner end face of the block and an annular wall having a bearing surface circumferentially encircling the block, and a removable cup-like member providing an end wall having a bearing surface to engage the outer end face of the block and an annular wall of greater diameter than the annular wall of said fixed member and in conjunction with adjacent walls forming an oil chamber exteriorly of and in communication with said bearing surfaces, and means for removably securing said removable member.

2. In bearings for rotary elements, a non-rotary cylindrical bearing block, and a journal box inclosing and rotating thereon and consisting of a cup-like member fixed to the rotary element and forming an end wall and the circumferential bearing surface of the box, and a removable cup-like member forming the opposite end wall of the box, and bolts for tightly clamping the removable member to the fixed member, an enlarged oil chamber being formed around the annular portion of the fixed member and within the annular portion of the removable member, said box providing oil passages through and past the edge of the annular portion of the fixed member to supply oil to the end and circumferential bearing surfaces.

3. In bearings for rotary elements, a journal box carried by the rotary element and consisting of a cup like member fixed to said element and having a laterally projecting annular portion of an external diameter less than the external diameter of said member, and a removable cup like member having a laterally projecting annular wall of greater internal diameter and also of greater length than the external diameter and length, respectively, of said annular portion of said fixed member, said removable member surrounding and forming an oil chamber around said annular portion of the fixed member and having the edge of its annular portion clamped to said fixed member and forming an oil tight joint, and accessible clamping screws passing removably through said removable member and into the annular portion of said fixed member.

4. In combination, a bearing block, and a rotary element provided with a journal box inclosing and rotatable on said block and having an outer surrounding wall and an internal annular wall forming a bearing surface surrounding said block and an oil chamber between said outer surrounding wall and said internal annular wall, said box having opposite exterior end walls forming bearing surfaces engaging the opposite sides of said block, respectively, and limiting the relative longitudinal play of the box and block, said box consisting of two cup-like opposite-side members one formed with said outer surrounding wall, and the other formed with said internal annular wall, one of said exterior end walls forming a side wall of said oil chamber and being spaced from the adjacent end edge of said internal annular wall to afford an annular radial oil space communicating with said chamber and with the adjacent bearing surfaces of the block and box.

5. In combination, a bearing block, and an element having a journal box inclosing and rotatable on said block, said box having opposite side exterior walls forming bearing surfaces at the opposite sides of said block and limiting the relative longitudinal movements of the block and box, said box consisting of two opposite-side members, one formed with an internal annular wall forming a bearing surface circumferentially surrounding said block and the other formed with a circumferential exterior wall providing an oil chamber between said internal and external walls, the outer side of said block and the adjacent side wall of said box being relatively formed to provide a central intervening oil cavity, said last mentioned side wall of the box forming a side wall of said oil chamber.

6. In combination, a bearing block, and an element having a journal box rotatable on and inclosing said block and having an internal annular wall forming a circumferential bearing surface for said block, said box having an outer surrounding wall and an oil chamber intervening between said walls and communicating with the bearing surfaces of the box and block, said box consisting of separable members providing side walls forming bearing surfaces for the opposite sides of the block, one member formed with said internal annular wall and the other member formed with said outer surrounding wall, said members being adjustable toward each other to limit the relative longitudinal movements of the block and box, annular packing and spacing means forming a portion of the exterior wall of said chamber and arranged between said members and adjustable in thickness to permit adjustment of said members toward each other, and adjusting means for securing said members.

7. In combination, a bearing block, and an element having a journal box inclosing and rotatable on said block and providing a circumferential bearing surface for and surrounding said block, said box having an interior oil chamber arranged exteriorly and circumferentially of said surface and in communication with the bearing surfaces of the box and block, said box consisting of separable members providing bearing surfaces for the opposite sides of the block and adjustable toward each other to limit the relative longitudinal movements of the block and box, one of said members having a flange to form the outer wall of said oil chamber and the other member having a flange to form the inner wall of said oil chamber, a series of superimposed annular spacing rings constituting a portion of the outer wall of said oil chamber and forming a tight joint between said members, said rings being separately removable to permit adjustment of said members toward each other, and adjusting means for securing said members together in the desired adjustment.

In testimony whereof I affix my signature in presence of two witnesses.

WILLIAM ELLIOTT.

Witnesses:
R. H. YALE,
F. A. RIDDEL.

Copies of this patent may be obtained for five cents each, by addressing the "Commissioner of Patents, Washington, D. C."